UNITED STATES PATENT OFFICE.

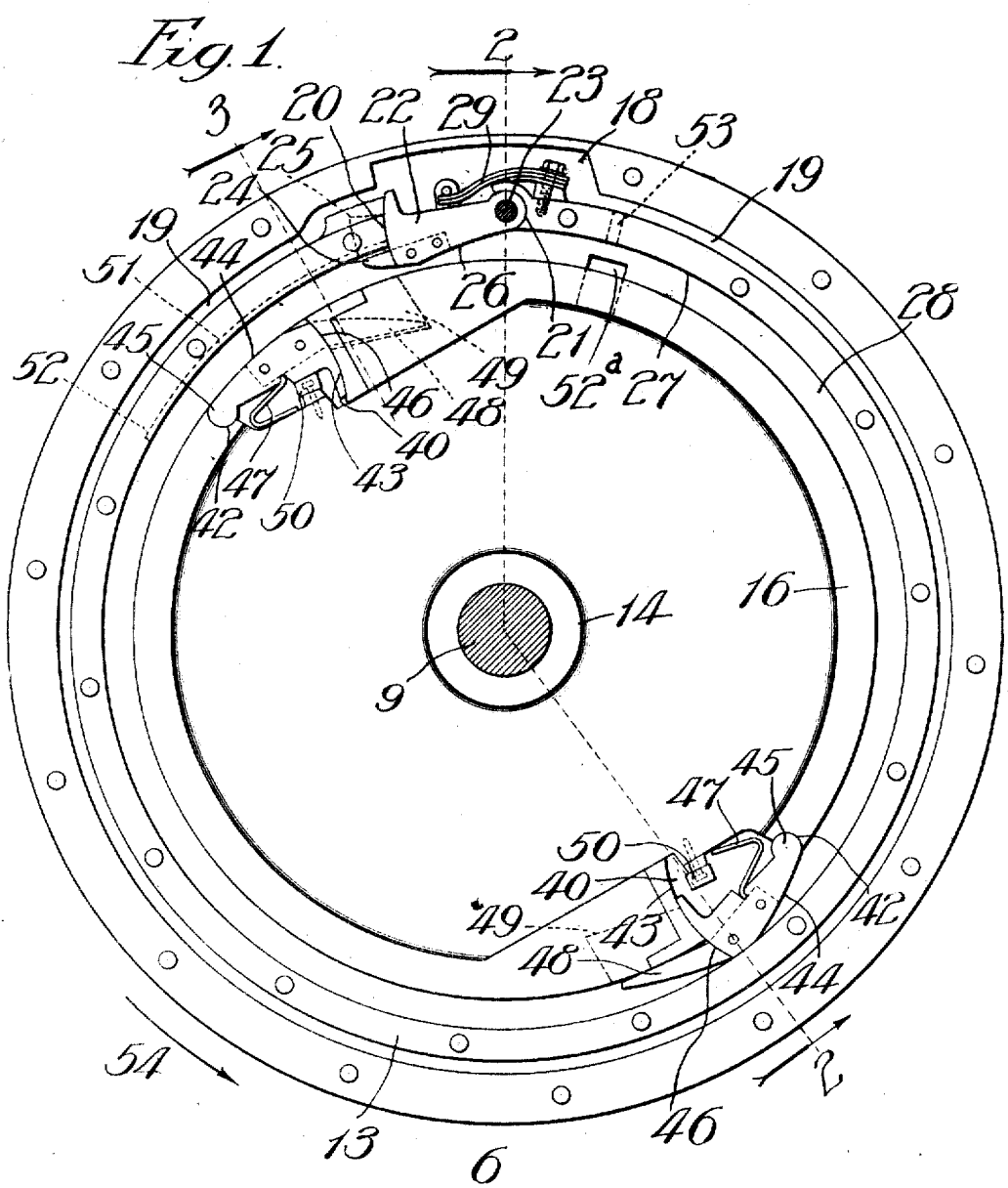

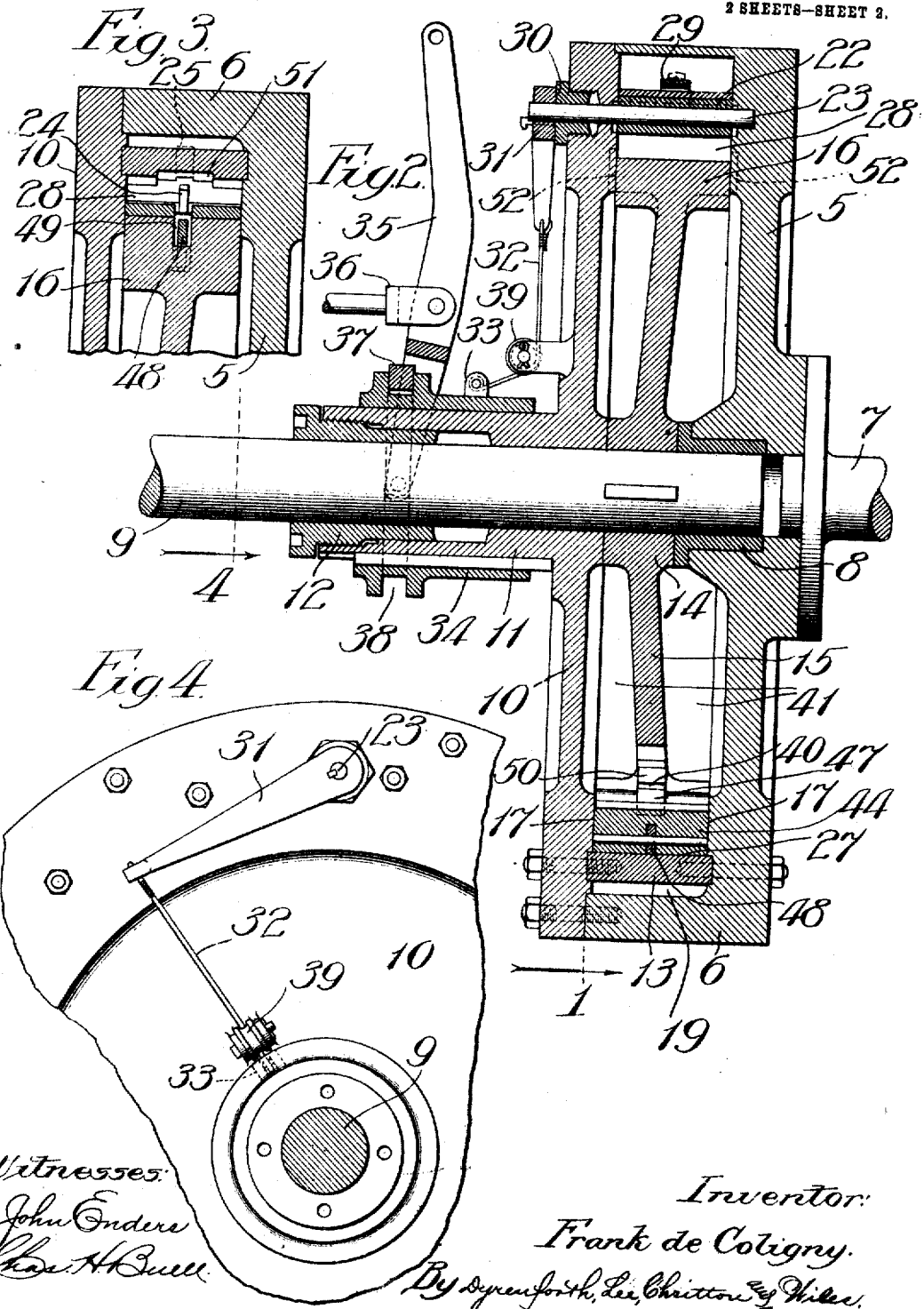

FRANK DE COLIGNY, OF CHICAGO, ILLINOIS, ASSIGNOR TO COLIGNY HYDRAULIC TRANSMISSION CO., A CORPORATION OF MICHIGAN.

HYDRAULIC CLUTCH.

933,233. Specification of Letters Patent. Patented Sept. 7, 1909.

Application filed April 8, 1909. Serial No. 488,756.

*To all whom it may concern:*

Be it known that I, FRANK DE COLIGNY, a citizen of the United States, residing at Chicago, in the county of Cook and State of Illinois, have invented a new and useful Improvement in Hydraulic Clutches, of which the following is a specification.

My invention relates to improvement in clutch-devices of the type wherein angular movement of one rotary member relative to another is controlled through the medium of a body of practically incompressible fluid confined between the members, and wherein the relative speed of rotation of one member is dependent upon the degree of slip of the said fluid past a valve adjustable from the outside of the device.

My object is to provide a hydraulic clutch, of the class described, of an improved construction, rendering it particularly simple, strong, durable and noiseless, and well adapted for its purpose.

In the accompanying drawings, wherein I show my improvements applied to a variable speed power-transmitter,—Figure 1 is an elevation of the device with one side of the casing removed, the view being in the nature of a section on line 1 in Fig. 2; Fig. 2, a broken section on the irregular line 2—2 in Fig. 1; Fig. 3, a broken section taken on line 3 in Fig. 1; and Fig. 4, a broken fragmentary sectional view, the section being taken on line 4 in Fig. 2, with the operating lever left out.

5 is one side of a hollow casing, or pulley, having an annular rim-portion 6 and fixed at its hub upon a shaft 7. Journaled at one end in a bearing-cup 8 in the hub of the casing is a shaft 9 in perfect alinement with the shaft 7. Removably secured to the rim 6 is a side 10 having a hub 11 fitting loosely around the shaft 9 and provided with an oil-confining stuffing-box 12. Let into and secured to the sides 5, 10, just within the rim 6, is a partition 13 describing a nearly complete circle concentric with the shaft 9. Confined between the inner surface of the side 10 and the bearing 8 is the hub 14 of a wheel having a center 15 and a rim 16. The hub 14 is feathered upon the shaft 9. The rim 16 of the wheel slides at opposite sides practically oil-tight against annular bearing-surfaces 17 formed on the sides 5, 10. The rim 6 is cut away at its inner side to form a chamber 18 communicating at opposite ends with an annular channel 19 surrounding the wall or partition 13. At the chamber 18 the said wall or partition is cut away to present the concave end-surfaces 20, 21.

22 is a swinging abutment forming a valve, mounted on a pin or rock-shaft 23 and having convex ends sliding practically oil-tight against the concave bearing surfaces 20, 21. At the center of the abutment-valve 22 is a narrow cam-projection 24 forming a contact surface, and the partition 13 is cut away, as indicated by the dotted lines 25, to form a socket into which the said cam-projection may move in the swinging of the abutment-valve. The inner surface 26 of the valve describes an arc of practically the same circle as the inner bearing-surface 27 of the annular partition 13. The outer surface of the wheel-rim 16 and the surface 27 form between them an annular space 28. A spring 29 in the chamber 18 engages the swinging valve 22 and tends normally to open the said valve by swinging it in the direction of the chamber 18. The valve 22 is fixed to the pin 23 which passes through a stuffing-box 30, in the side 10 beyond which it carries a crank-arm 31. The crank-arm is connected by a cable 32 with an ear 33 on a sliding sleeve 34 surrounding and feathered upon the hub 11.

35 is an operating lever fulcrumed between its ends to a stationary support 36 and pivotally secured at one end to a segmental stirrup-block 37 loosely engaging an annular groove 38 in the sliding-sleeve 34. The cable passes under a pulley 39 on the side 10. Movement of the operating-lever 35 to the right in Fig. 2 slides the sleeves 34 in the outward direction, drawing upon the cable 32 and swinging the arm 31 inward, thereby moving the valve 22 against resistance of the spring 29 in the direction of the rim 16 to close across the space 28.

In the circumferential portion of the inner wheel are recesses 40, 40, at diametrically opposite points, extending through the rim 16 into the web, or wheel center, 15 and in open communication with the space or chamber 41 which is surrounded by the rim 16. Each recess or pocket 40 is shaped with concave bearing-surfaces 42, 43 at opposite ends, as indicated in Fig. 1. In each said recess or pocket is a swinging abutment 44 having a convex end 45 fitting the concave socket 42, in which it is pivoted, and a convex abutment or presser face 46 sliding oil-tight against the concave face 43. Each abutment 44 is of a width corresponding with the distance between the opposite bearing-surfaces 17 against which it slides in approximately oil-tight contact. In each pocket 40 is a spring 47 bearing against the under side of the abutment and tending to swing and close the latter against the surface 27. Each abutment has a central forward-extending cam-projection 48 which, in the swinging of the abutment, moves into and out of a pocket-extension 49 in the wheel-rim 16. Also in each pocket is a cushioning-buffer 50, preferably of a resilient type, against which the abutment strikes when opened wide, as indicated toward the top of Fig. 1. Formed in the inner face 27 of the partition 13 is a recess or channel 51 extending from the end 20 to the point indicated by 52 in Fig. 1. In practice, the chamber 41, surrounded by the wheel-rim 16, and the annular space 28 are nearly filled with an incompressible liquid, such as a suitable oil. The recesses or pockets 40 afford communication between opposite sides of the web 15, and in the bearing-surfaces 17 just back of the abutment-valve 22 are recesses 52ª forming open communication between the chamber 41 and space 28. Normally the abutments 44 are swung on their pivots, at 45, by the springs 47 to close oil-tight across the space 28 against the annular bearing-surface 27, and the abutment-valve 22 may be swung, by means of the lever 35, as described, to close oil-tight across said space against the surface of the rim 16.

In the construction illustrated, the shaft 7, with the casing and parts carried thereby, may constitute the driving, or active, member of the power-transmitter, and the shaft 9, with the parts carried thereby, may constitute the driven, or reactive, member, though it will be readily apparent that this order may be reversed. In operation, when the abutment-valve 22 is opened by the spring 29 to cause its inner surface to coincide with the surface 27, the turning of the said active member will present no obstruction to the oil and the said reactive member will remain unmoved. If the long arm of the lever 35 is swung to the extreme right, in Fig. 2, the abutment-valve 22 is swung at its forward end against the rim 16 to close practically oil-tight across the space 28, whereby the turning of the said active member in the direction of the arrow 54 causes it to bear against the body of oil confined between it and the extended, or closed, abutment 44 carried by the reactive member. This would cause the active member to rotate the reactive member at a rate of speed equal to that of the active member. The adjustment of the swinging abutment-valve 22 away from the surface of the rim 16 opens a passage in the space 28 through which the confined liquid may slip, at a rate governed by the size of the open passage, thereby proportionately reducing or relieving the pressure upon the body of liquid, and causing a proportionate relative reduction of the speed of the reactive member. The convex swinging ends of the abutments and abutment-valve describe arcs of circles, drawn from the pivots of those parts, and they slide practically oil-tight against the convex bearing-surfaces 43, 20. Though the said ends are slightly convex, they form abrupt presser-faces, extending at right angles to their direction of travel, whereby the pressure of the liquid against them, in the space 28, has no tendency to swing the abutments on their pivots. The swinging abutment-valve and abutments, constructed as shown and described, are preferable to the radially-movable vanes usually provided in devices of this character, for the reason that the confined body oil, particularly when there is no slip, is subjected to great pressure, and when abutments in the form of radially-movable vanes are employed the binding pressure against them is so great as to render movement thereof difficult and wearing upon the adjusting mechanism.

One of my principal objects is to avoid, as far as possible, impact between moving parts, so as to cause them to move noiselessly and without jar or vibrations. This I effect by causing the abutments as they approach the abutment-valve to be opened altogether by the pressure of the liquid. When an abutment in moving, figuratively speaking, toward the valve, passes the forward end 52 of the channel 51, the liquid in the latter exerts centripetal pressure against the outer face of the abutment and swings it quickly, to open position, against the resistance of its spring 47, causing the outer surface of the abutment to extend in the arc of the outer surface of the rim 16, as indicated in the upper part of Fig. 1. The cam-projections 24, 48 are safety means, provided, as a precautionary measure, to prevent impact between the presser-faces of the valve and an abutment, under any circumstances. The resilient buffers 50 coupled with the resistance of the springs 47 tend to render the opening movements of the abutments noiseless. Immediately that an abutment passes the forward end of the channel 51 and closes, the pressure of the partly-closed valve is exerted through the body of liquid against the next abutment. As there is practically no pressure against the liquid behind the valve 22, as soon as an abutment passes the valve the centripetal pressure against it is relieved and it is free to open under the resilient action of its spring 47.

The only possible leakage of liquid from the device would be through the stuffing-boxes 12, 30, and it is a simple matter, in the construction shown, to prevent material leakage. Reduction in the amount of liquid in the device will not affect its operation so long as there is sufficient liquid to maintain the space 28 filled. The channel 52 affords a means whereby liquid is supplied from the central chamber 41 to the space 28 by centrifugal force. Behind the valve 22 is an opening 53 between the channel 19 and space 28, which prevents oil from being confined against movement in the chamber 18 and thereby interfering with the opening of the valve 22.

The construction dispenses with valves other than the adjustable abutment-valve; and by means of the adjusting mechanism described the degree of slip of the confined body of liquid, and consequently the power-transmission, may be quickly and accurately changed as desired. The lever 35 may be operated manually, or from a speed-governor, in any desired manner; and the construction may be easily arranged to cause what I have termed the driving, or active, member to be the driven, or reactive, member, or vice versa.

My improvements may be readily employed as a hydraulic-brake by causing the reactive member to be a stationary part of the device; and the construction shown and described may be variously modified, in the matter of details, or to adapt it for a particular purpose, without departing from the spirit of my invention as defined by the claims.

What I claim as new and desire to secure by Letters Patent is—

1. In a device of the character described, the combination of active and reactive members forming between them an annular liquid-holding space, an abutment carried by one of the members and closing normally across said space, an abutment forming a valve carried by the other member and adjustable from the outside to varying extents of closure across said space, and means for causing the liquid-pressure in said space to produce opening movement of one of said abutments as it approaches the other.

2. In a device of the character described, the combination of active and reactive members forming between them an annular liquid-holding space, an abutment having an abrupt presser-face carried by one of the members and closing normally across said space, an abutment having an abrupt presser-face forming a valve carried by the other member and adjustable from the outside to varying extents of closure across said space, and means for causing the liquid-pressure in said space to produce opening movement of one of said abutments as it approaches the other.

3. In a device of the character described, the combination of active and reactive members forming between them an annular liquid-holding space, a swinging abutment carried by one of the members and closing normally across said space, an abutment forming a valve carried by the other member and adjustable across said space, and means for causing the liquid-pressure in said space to produce opening movement of one of said abutments as it approaches the other.

4. In a device of the character described, the combination of active and reactive members forming between them an annular liquid-holding space, a plurality of abutments carried by one of the members and closing normally across said space, an abutment forming a valve carried by the other member and adjustable from the outside to varying extents of closure across said space, and means for causing the liquid-pressure in said space to produce opening movement of one of said abutments as it approaches the other.

5. In a device of the character described, the combination of active and reactive members forming between them an annular liquid-holding space, a plurality of swinging abutments carried by one of the members and closing normally across said space, an abutment-valve carried by the other member and adjustable from the outside to varying extents of closure across said space, and means for causing the liquid-pressure in said space to produce opening movement of said swinging abutments as they approach the abutment-valve.

6. In a device of the character described, the combination of active and reactive members forming between them an annular liquid-holding space, a plurality of swinging abutments carried by one of the members and closing normally across said space, an abutment-valve carried by the other member and adjustable from the outside to varying extents of closure across said space, means for causing the liquid-pressure in said space to produce opening movement of said swinging abutments as they approach the abutment-valve, and means for cushioning the swinging abutments in their opening movement.

7. In a device of the character described, the combination of active and reactive members forming between them an annular liquid-holding space, an abutment carried by one of the members and closing normally across said space, an abutment forming a valve carried by the other member and adjustable across said space, a spring tending to move the valve in one direction, means for adjusting the valve from the outside to varying positions against the resistance of said spring, and means for causing the liquid-pressure in said space to produce opening movement of one of said abutments as it approaches the other.

8. In a device of the character described, the combination of active and reactive members forming between them an annular liquid-holding space, an abutment carried by one of the members and closing normally across said space, an abutment forming a valve carried by the other member, a spring tending normally to open said valve, means for adjusting said valve from the outside to varying extents of closure across said space, and means for causing the liquid-pressure in said space to produce opening movement of one of said abutments as it approaches the other.

9. In a device of the character described, the combination of active and reactive members forming between them an annular liquid-holding space, an abutment carried by one of the members and closing normally across said space, an abutment forming a valve carried by the other member and adjustable from the outside to varying extents of closure across said space, liquid-supplying means for said space communicating therewith behind said valve, and means for causing the liquid-pressure in said space to produce opening movement of one of said abutments as it approaches the other.

10. In a device of the character described, the combination of active and reactive members forming between them an annular liquid-holding space, a plurality of abutments carried by one of the members and closing normally across said space, an abutment-valve carried by the other member and adjustable from the outside to varying extents of closure across said space, liquid-supplying means for said space communicating therewith behind said abutment-valve, and means for producing opening movement of the abutments as they approach but before they reach the abutment-valve.

11. In a device of the character described, the combination of active and reactive members forming between them an annular liquid-holding space, an abutment carried by one of the members formed with an abrupt presser-face closing normally across said space, an abutment forming a valve carried by the other member having an abrupt presser-face and adjustable from the outside to varying extents of closure across said space, means for causing the liquid-pressure in said space to produce opening movement of one of said abutments as it approaches the other, and means carried by the abutments themselves for preventing impact between the presser-surfaces of the abutments, under any circumstances.

12. In a device of the character described, the combination of active and reactive members forming between them an annular liquid-holding space, a swinging abutment pivoted at one end to one of the members and formed at its opposite swinging end with an abrupt presser-face at which it closes normally across said space, an abutment-valve carried by the other member and adjustable from the outside to varying extents of closure across said space, means for causing the liquid-pressure in said space to produce opening movement of the abutment as it approaches the valve, and means for preventing impact between the presser-face of the abutment and valve, under any circumstances, comprising mutually-engageable abutment-deflecting contacts carried by the said abutment and valve.

13. In a device of the character described, the combination of active and reactive members forming between them an annular liquid-holding space, a plurality of swinging abutments having abrupt presser-faces carried by one of the members and closing normally across said space, a swinging abutment-valve carried by the other member having an abrupt presser-face and adjustable from the outside to varying extents of closure across said space, means for causing the liquid-pressure in said space to produce opening movement of said abutments as they approach but before they reach the abutment-valve, and means for preventing impact between the presser-surfaces of the abutments and abutment-valve, under any circumstances.

14. In a device of the character described, the combination of active and reactive members forming between them an annular liquid-holding space, a plurality of swinging abutments having abrupt presser-faces carried by one of the members and closing normally across said space, a swinging abutment-valve carried by the other member having an abrupt presser-face and adjustable from the outside to varying extents of closure across said space, means for causing the liquid-pressure in said space to produce opening movement of said abutments as they approach, but before they reach, the abutment-valve, and means for preventing impact between the presser-surfaces of the abutments and abutment-valve, under any circumstances, comprising mutually-engageable cam-projections on said presser-faces.

15. In a device of the character described, the combination of active and reactive members forming between them an annular liquid-holding space, an abutment carried by one of the members and closing normally across said space, a swinging abutment-valve carried by the other member, means for moving said abutment out of the path of the abutment valve as it approaches said valve, and means for adjusting the abutment-valve to varying extents of closure across said
5 space, comprising a rock-shaft on which said valve is mounted extending to the outside of the device, a crank on the rock-shaft, an operating lever and a cable connected at one end with said crank and operatively connected at its opposite end with said lever.

FRANK DE COLIGNY.

In the presence of—
J. G. ANDERSON,
R. A. RAYMOND.